(12) United States Patent
Gallagher

(10) Patent No.: US 7,327,504 B2
(45) Date of Patent: Feb. 5, 2008

(54) METHOD OF DETECTING CLIPPED IMAGE PIXELS

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1152 days.

(21) Appl. No.: 10/313,612

(22) Filed: Dec. 6, 2002

(65) Prior Publication Data

US 2004/0109072 A1 Jun. 10, 2004

(51) Int. Cl.
*G06F 15/00* (2006.01)
*G03F 3/08* (2006.01)
*H04N 9/64* (2006.01)

(52) U.S. Cl. .................. 358/518; 358/1.9; 348/246

(58) Field of Classification Search ............. 358/1.9, 358/518, 520, 521, 522, 530, 539; 382/162, 382/167, 270, 274, 172; 348/246, 247, 223.1, 348/231.9
See application file for complete search history.

(56) References Cited

U.S. PATENT DOCUMENTS

| | | | | |
|---|---|---|---|---|
| 4,945,406 A | | 7/1990 | Cok | 358/80 |
| 5,822,453 A | | 10/1998 | Lee et al. | 382/169 |
| 5,959,720 A | * | 9/1999 | Kwon et al. | 355/38 |
| 5,999,279 A | * | 12/1999 | Kouzaki et al. | 358/520 |
| 6,040,858 A | * | 3/2000 | Ikeda | 348/242 |
| 6,377,269 B1 | | 4/2002 | Kay et al. | 345/589 |
| 6,628,833 B1 | * | 9/2003 | Horie | 382/173 |
| 6,633,655 B1 | * | 10/2003 | Hong et al. | 382/118 |
| 6,663,242 B1 | * | 12/2003 | Davenport | 351/221 |
| 6,665,434 B1 | * | 12/2003 | Yamaguchi | 382/162 |
| 6,721,066 B2 | * | 4/2004 | Hirota et al. | 358/1.9 |
| 6,765,611 B1 | * | 7/2004 | Gallagher et al. | 348/222.1 |
| 6,956,967 B2 | * | 10/2005 | Gindele et al. | 382/167 |
| 7,020,329 B2 | * | 3/2006 | Prempraneerach et al. | 382/164 |
| 7,158,688 B2 | * | 1/2007 | Nako et al. | 382/275 |
| 7,167,597 B2 | * | 1/2007 | Matsushima | 382/274 |
| 7,177,462 B2 | * | 2/2007 | Hirota et al. | 382/162 |
| 2002/0027563 A1 | * | 3/2002 | Van Doan et al. | 345/630 |
| 2002/0110376 A1 | * | 8/2002 | MacLean et al. | 396/429 |
| 2002/0158986 A1 | * | 10/2002 | Baer | 348/362 |
| 2003/0044061 A1 | * | 3/2003 | Prempraneerach et al. | 382/164 |
| 2003/0052979 A1 | * | 3/2003 | Soga et al. | 348/241 |
| 2003/0098914 A1 | * | 5/2003 | Easwar | 348/229.1 |
| 2003/0099407 A1 | * | 5/2003 | Matsushima | 382/274 |
| 2003/0151674 A1 | * | 8/2003 | Lin | 348/222.1 |
| 2003/0215133 A1 | * | 11/2003 | Gindele et al. | 382/167 |
| 2003/0222991 A1 | * | 12/2003 | Muammar et al. | 348/222.1 |
| 2004/0046816 A1 | * | 3/2004 | Miquel et al. | 347/15 |
| 2004/0070565 A1 | * | 4/2004 | Nayar et al. | 345/156 |
| 2004/0184057 A1 | * | 9/2004 | Nakabayshi et al. | 358/1.9 |
| 2006/0008139 A1 | * | 1/2006 | Hirota et al. | 382/162 |
| 2006/0256214 A1 | * | 11/2006 | MacLean et al. | 348/234 |

FOREIGN PATENT DOCUMENTS

WO WO 00/79784 12/2000

* cited by examiner

*Primary Examiner*—Madeleine A V Nguyen
(74) *Attorney, Agent, or Firm*—David M. Woods

(57) ABSTRACT

A method is described for detecting the clipped pixels of a digital color image. The method includes the steps of: (a) producing a uniformity map from the digital color image, where the uniformity map indicates locations within the digital color image that are substantially uniform; (b) providing a threshold value; and (c) using the uniformity map, the threshold value, and the digital color image to produce a map indicating the location of clipped pixels within the digital color image.

16 Claims, 3 Drawing Sheets

METHOD OF DETECTING CLIPPED IMAGE PIXELS

FIELD OF THE INVENTION

The present invention relates to the field of image processing, and in particular to the improvement of images that are subject to clipping.

BACKGROUND OF THE INVENTION

In a digital image, clipping appears as a uniform area. Clipping usually detracts from the quality of the image. A pixel can be clipped in only one color channel, or simultaneously in multiple or all color channels.

Clipping can result from a number of causes. Numerical clipping occurs when the value of the pixel reaches a limit of an allowable range. In an 8-bit per pixel per color channel system, numerically clipped regions appear as pixels having a value of 0 or 255. Clipping can occur from saturation, meaning that at some point in the image processing path, the pixel value (in either analog or digital form) reaches a limiting value. For example, if photosites of an imaging sensor are saturated, then the digital value from the A/D converter will be some maximum value.

It is useful to know if a digital image has clipped pixel values, and where those pixels are located. When manipulating an image, it is especially easy to produce visually objectionable artifacts corresponding to clipped pixels of the digital image.

In U.S. Pat. No. 6,377,269, which issued in the names of Kay and Bradenberg, a method is described for generating image masks. The method determines whether an image contains clipped pixel components, then depending on the results either applies a separate background compensation for each of several images, or applies the same background compensation for each of several images. This method does not explain how to detect whether the image contains a clipped pixel component. U.S. Pat. No. 6,476,865, which issued in the names of Gindele and Gallagher, describes an imaging device. A different interpolation method is used for photosites that are clipped than for non-clipped photosites. Clipped photosites are defined as those that produce the maximum A/D converter value. In addition, EP1186163 describes an imaging system where thresholds are used to identify saturated pixels, which receive different treatment during interpolation.

The prior art methods of detecting clipped or saturated pixels use a simple thresholding operation. However, it is incorrect to assume that the detection of clipped pixels is a simple problem that can be solved with only a thresholding operation. It is easy to find image examples where a simple threshold cannot adequately distinguish the clipped pixels from the non-clipped pixels. For simplicity, consider clipping on the high end of an 8 bit per pixel per color channel digital image. Many images have apparently clipped regions of pixels with a value below 255 (e.g. 251, or 248, or 253). Further complicating the matter is that within the same image and color channel, an apparently non-clipped region of pixels may have pixel values larger than those of the clipped region. Thus, none of the prior art methods of detecting clipped pixels are adequate, because either some clipped pixels would be misclassified as non-clipped, or some non-clipped pixels would be misclassified as clipped.

It is important to realize that an image pixel can become clipped during any number of places throughout an image processing path (the series of image transforms, either analog or digital that process the image.) For example, if clipping occurs electronically at the image sensor, then the A/D converter will produce a maximum attainable digital value for the pixel. However, clipping can occur later during the image processing path, such as when applying color transforms or look-up-tables (LUTs). Once a region of pixels is clipped, subsequent image transforms of the image processing path can re-arrange the pixel values so that the value of the clipped pixels can depend on, for instance, the color of the pixel. Thus, clipping can occur at many different points, and a simple threshold is inadequate to detect clipped pixels.

Thus there exists a need for an improved method of detecting clipped pixels in digital images.

SUMMARY OF THE INVENTION

The present invention is directed to overcoming one or more of the problems set forth above. Briefly summarized, according to one aspect of the present invention, the invention resides in a method for detecting the clipped pixels of a digital color image, comprising the steps of: (a) producing a uniformity map from the digital color image, said uniformity map indicating locations within the digital color image that are substantially uniform; (b) providing a threshold value; and (c) using the uniformity map, the threshold value, and the digital color image to produce a map indicating the location of clipped pixels within the digital color image.

Since it is useful to know if a digital image has clipped pixel values, and where those pixels are located, the advantage of the invention is that, when manipulating an image, having knowledge of the location of all, or most, clipped pixels makes it more feasible to avoid producing visually objectionable artifacts corresponding to such clipped pixels of the digital image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
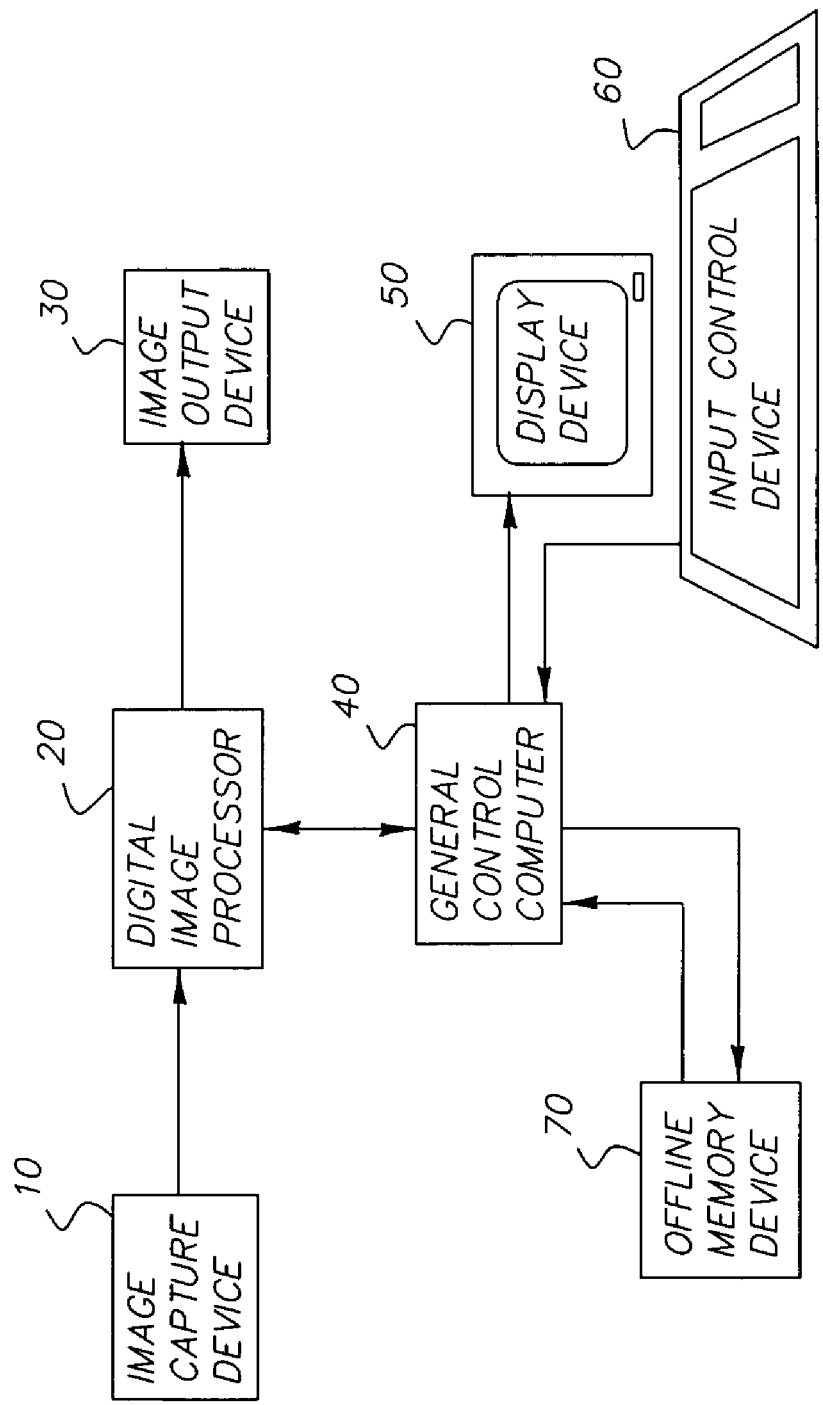
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer (not shown). The system can also include an input control device 60 for an operator such as a keyboard and or mouse pointer. The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions. Additionally, FIG. 1 can represent a digital camera.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of a pixel. For color imaging applications, a digital image will often comprise red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that, for digital image processing steps described hereinbelow, replacing original pixel values with processed pixel values is functionally equivalent to describing the same processing steps as generating a new digital image with the processed pixel values while retaining the original pixel values.

Figure 2:
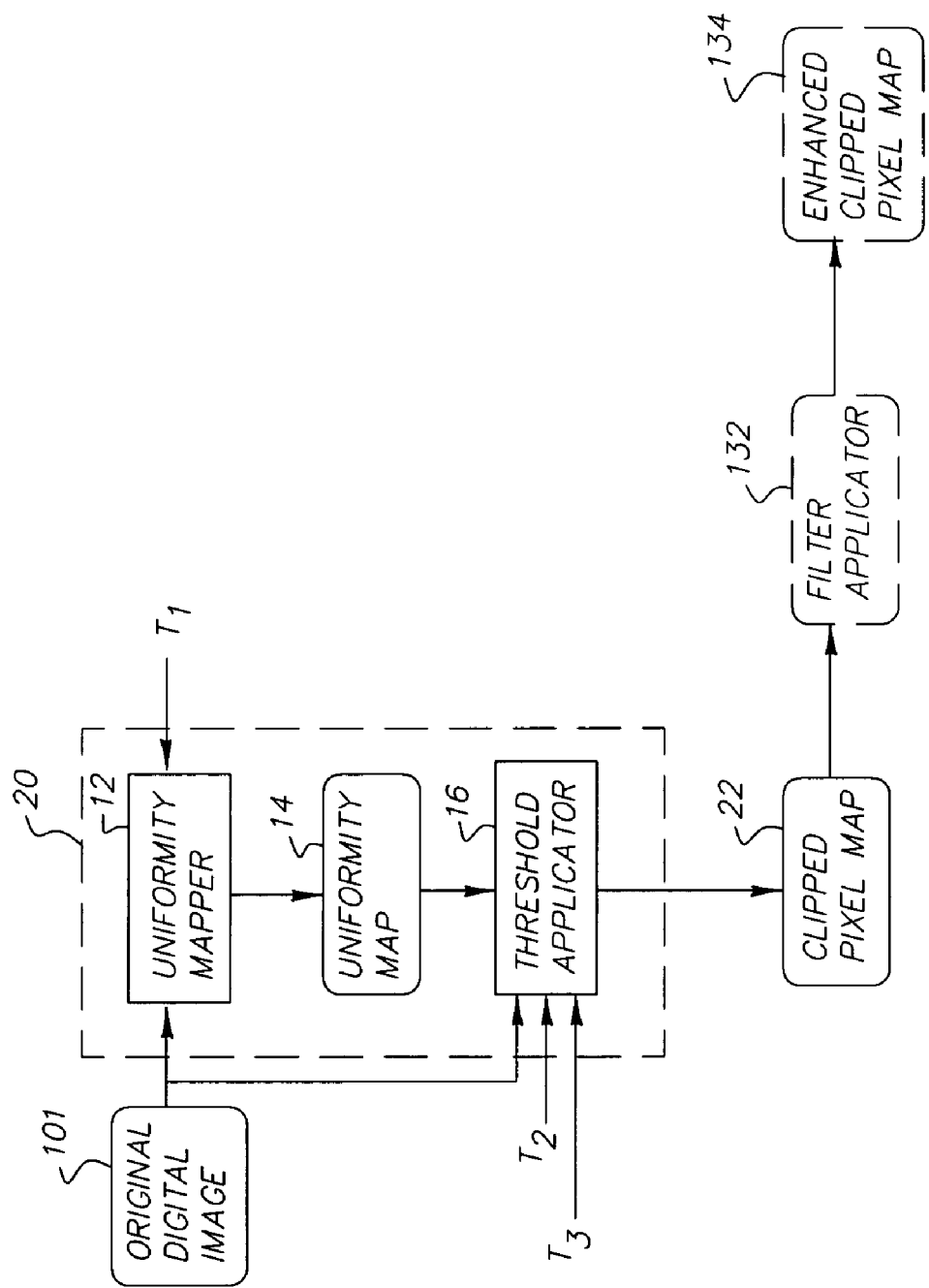
FIG. 2 is a block diagram of the digital image processor of FIG. 1 incorporating functionality according to the present invention for detecting clipped image pixels.

The digital image processor 20 shown in FIG. 1 and programmed to perform the method of the present invention is illustrated in more detail in FIG. 2. An original digital image 101 can be received from the image capture device (shown in FIG. 1) in a variety of different color representations. However, the most typical implementation of the present invention receives the original digital image as a color digital image with red, green, and blue digital image channels. Preferably, the pixel values of the original digital image are ready to be displayed on a monitor or sent to a printer. For example, the pixel values could be in the well-known sRGB metric (see www.sRGB.com for a description of this metric). Each color component of each pixel is represented by N bits. Typically, N=8, so the value of the pixels can range from 0 to 255. The source of the digital images is the image capture device 10, which can be a digital camera, a digital film scanner, or the like.

The definition of a clipped pixel is a pixel whose value has either reached a minimum or maximum possible value (either analog or digital) at some point of processing throughout the image processing path.

The digital image is passed into a uniformity mapper 12 for creating the uniformity map u(x,y). Preferably, the uniformity map 14 contains the same number of rows and columns of pixels as does the original digital image 101. In addition, the uniformity map u(x,y) preferably has the same number of channels as does the original digital image 101. The uniformity map 14 is a binary image map 14 that indicates locations within the digital image 101 that are substantially uniform in terms of the values of pixels within a local region. The purpose for calculating the uniformity map 14 relates to the fact that clipped pixels cannot be successfully detected using only a threshold operation. However, one defining characteristic of regions of clipped pixels is that there is a complete lack of image detail (i.e. the region is uniform). Therefore, the uniformity map 14 indicates pixels within the image having an associated local region that is uniform (i.e. has no detail). The uniformity map 14 is created according to the following algorithm:

A pixel value of 1 in the uniformity map 14 indicates that all pixels (of the same color channel) within a local region centered at the corresponding location in the original image are close in value. The uniformity map is calculated as follows:

For each pixel $(x_o, y_o)$ of each color channel of the digital image:
1. Select a corresponding local region. Preferably an N×N window centered at $(x_o, y_o)$ is used as the local region.
2. The uniformity map at position $(x_0, y_0)$=1 when the maximum minus the minimum of the pixel values of the local region is less than a threshold T1. Otherwise, the uniformity map at position $(x_o, y_o)$=0. Preferably, T1=1, which means that the uniformity map will have a value of 1 only at locations with a corresponding local region where all pixel values are equal. Those skilled in the art will recognize that measures of local variation other than the aforementioned maximum minus minimum may be used by the uniformity mapper 12.

Those skilled in the art will recognize that the threshold T1 may be dependent on the amount of noise (possibly due to image compression) that is added to the image after the clipping occurred.

For the case of a digital image having red, green, and blue image channels, the uniformity map preferably has three channels corresponding to the uniformity within the red channel, the uniformity of the green channel, and the uniformity of the blue channel.

Referring again to FIG. 2 to describe a second embodiment of the invention, the uniformity map u(x,y) is input to the threshold applicator 16. In this embodiment, the threshold applicator 16 uses the uniformity map 14, two or more thresholds, and the original digital image to produce a clipped pixel map 22. A pixel value (located at xo,yo) of 1 in the clipped pixel map indicates that the algorithm had classified that pixel as clipped in the corresponding color channel. Again, ideally the clipped pixel map 22 contains the same number of rows and columns of pixels as does the original digital image. The remainder of the description will be in regard to digital images having pixel values encoded with 8 bits per color channel per pixel, as described by the sRGB metric. Those skilled in the art will readily recognize that any discussion related to the specific bit depth or numerical range of pixel values can be easily modified to facilitate operation with digital images having a different encoding, different color space, different bit depth, or numerical range. In addition, the following description contains equations for detecting clipping on the higher end of the numerical range or allowable pixel values. Again, those skilled in the art of image processing will readily recognize that simple modifications to the equations (such as replacing >with <) will allow detection of clipped pixels on the lower end of the numerical range of allowable pixel values.

The threshold applicator 16 generates the clipped pixel map 22, as follows. The pixel p(x,y) from the original digital image 101 is classified as clipped if and only if:

$$p(x,y) \geq T_2 \text{ OR}$$

$$p(x,y) \geq T_3 \text{ AND } u(x,y)=1$$

In words, threshold T2 defines an absolute clipping threshold. Any pixel whose value is equal to or greater than T2 is classified as a clipped pixel. Additionally, any pixel whose value is greater than or equal to T3 and is in a uniform local region is also classified as a clipped pixel. Preferably, the value of T2=255 and T3=245 when the original digital image has 8 bits per color channel per pixel and is in the sRGB metric.

Optionally, the clipped pixel map c(x,y) can be input to a filter applicator 132 for application of a filter to the clipped pixel map. For example, a median filter could be applied to remove small, isolated regions of pixels classified as clipped from the final clipped pixel map. A constrained growing operation could also be performed to classify more pixels as clipped pixels, providing that the pixels are within a defined distance from pixels already classified as clipped, and providing that the pixels have the same pixel value as those near-by pixels that have already been classified as clipped. If the filter applicator 132 is used, then the output of the filter applicator is an enhanced clipped pixel map 134 that is used instead of the output of the threshold applicator in subsequent processing.

Figure 3:
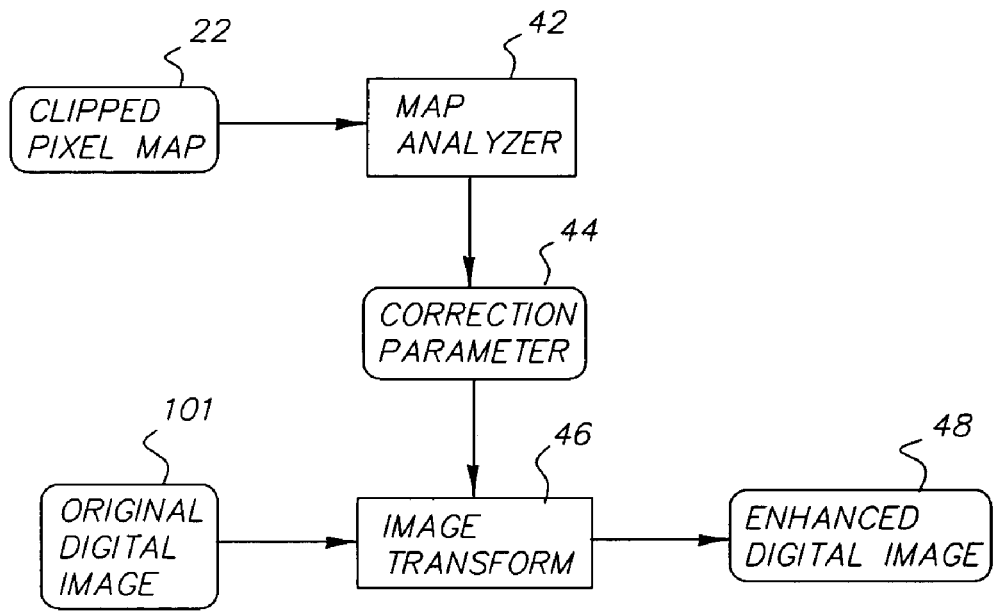
FIG. 3 is a block diagram of a method for applying a map analyzer to the clipped pixel map developed in the processor shown in FIG. 2 in order to modify an image transform.

Referring to FIG. 3, an image transform 46 is an operation that accepts an input image and possibly control parameters, and in a repeatable fashion, generates an output image. The quality of the output image often depends greatly on the values of the control parameters. It has been observed that images having no clipped pixels often have a different set of optimal control parameters than those of images containing clipped pixels. Therefore, improved image quality is attained when the control parameters are selected in accordance with an analysis of the clipped pixel map c(x,y) 22.

FIG. 3 illustrates the inventive interaction between the clipped pixel map and the image transforms that are applied to the digital image. The clipped pixel map c(x,y) 22 is input to a map analyzer 42 in order to analyze the map. As a result of the map analysis, the map analyzer determines and outputs one or more correction parameters 44. The correction parameters 44 are input to an image transform 46, along with the digital image. The image transform processes the digital image according to the correction parameters 44, and outputs an enhanced digital image 48.

The image transform 46 can be a balance applicator that applies a scene balance algorithm to the image. Image balancing is often performed by a scene balance algorithm (SBA) or an automatic exposure determination algorithm (such as are used in high speed optical printers or in a Photo-CD scanner, see for example U.S. Pat. No. 4,945,406). With reference to FIG. 3, when the image transform is a balance applicator, the correction parameter may be a parameter that limits the allowable amount of lightness change that can be produced by the scene balance algorithm. For example, in the case where the map analyzer 42 determines that many pixels of the digital image are clipped highlight pixels the correction parameter may indicate that the scene balance algorithm is not allowed to darken the image. This limitation reduces the chances of creating objectionable artifacts in the enhanced digital image.

Also, the image transform 46 can be a contrast adjuster that determines and applies tonal modifications to the image. The contrast of the image may be estimated by an automatic algorithm. In addition, the contrast of the digital image may likewise be modified to a preferred level of contrast. An example of an algorithm that estimates image contrast and provides a means of adjusting the contrast of the image is described in U.S. Pat. No. 5,822,453, by Lee and Kwon. Generally, contrast adjustment is implemented in images by the application of a look-up-table, although equivalently an equation or set of equations can be used. The correction parameter can be used to reduce the magnitude of or frequency that artifacts are created in the image. For example, when an 8-bit per color channel per pixel sRGB image has a significant amount of clipped highlight pixels as determined by the map analyzer 42, then the correction parameter 44 that is passed to the correction algorithm 46 ensures that highlight pixel code values (e.g. values greater than 240) at are not modified by the tone scale function.

Figure 4:
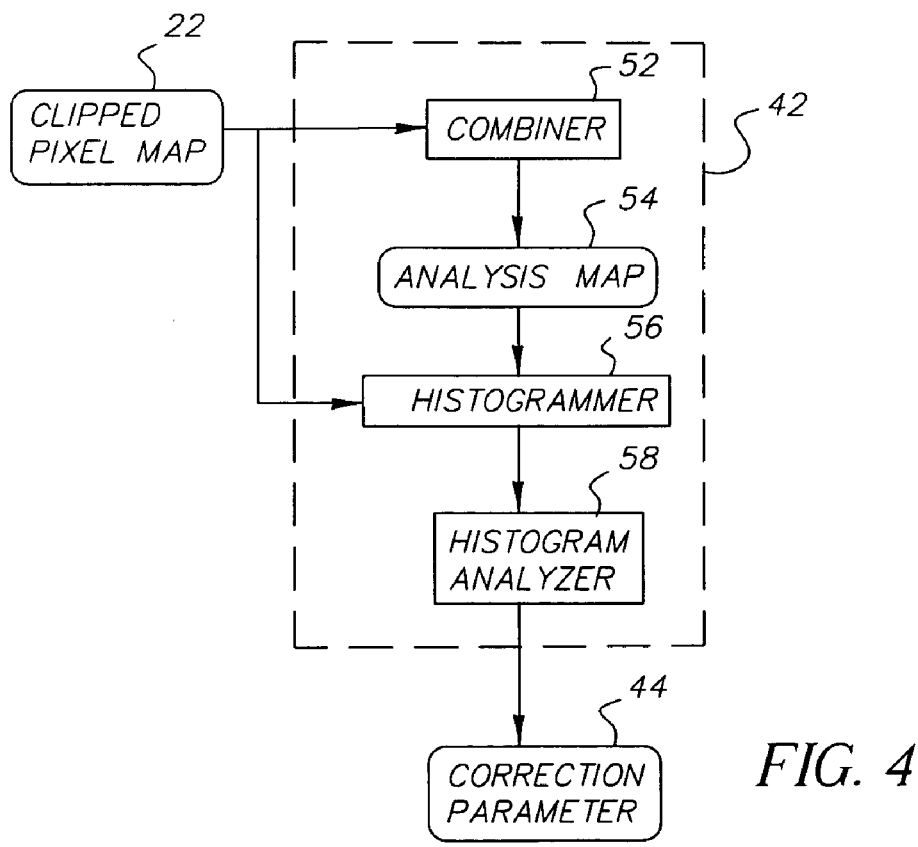
FIG. 4 is a block diagram of a method illustrating the map analyzer of FIG. 3 in more detail.

FIG. 4 illustrates the map analyzer 42 of FIG. 3 in more detail. The clipped pixel map 22 is input to a combiner 52. The combiner is used to process the multiple channels of the clipped pixel map 22 and produce an analysis map 54 having a single channel (but preferably the same number of rows and columns of pixels as the clipped pixel map 22.) The analysis map 54 a(x,y) is preferably created by the following relationship:

$$A(x,y)=1 \text{ if } c(x,y)=1 \text{ for all channels}$$

$$A(x,y)=0 \text{ otherwise.}$$

In other words, the analysis map is 1 for pixel locations corresponding to locations of the clipped pixel map 22 having a value of 1 (i.e. a classified clipped pixel value) for all channels. In other words, the analysis map 54 indicates locations in the original digital image 101 that are "triply-clipped". The analysis map is passed to the histogrammer 56. The purpose of the histogrammer 56 is to generate histograms of the pixel values for each of the channels of the original digital image 101 corresponding to the triply-clipped pixels. The histogrammer 56 outputs a set of histograms, one for each channel of the original digital image. Each histogram is a histogram of pixel values for the particular image channel for those pixels classified as triply-clipped. These histograms are input to the histogram analyzer 58 for analysis. The histogram analyzer 58 analyzes the histograms to determine a clipping value for each channel of the original digital image. This clipping value corresponds to the value having the largest associated histogram value of the histogram of triply clipped pixels for that particular channel. The clipping value for each channel of the original digital image found by the histogram analyzer 58 is output from the map analyzer 42 as the correction parameter 44. Thus, the correction parameter indicates the value at which clipping occurs when all three channels are clipped. These correction parameters 44 can be used by the aforementioned image transform 46 of FIG. 3 to improve image quality. For example, when the image transform 46 is a contrast adjuster, the contrast adjuster can use the correction parameter to ensure that the value at which clipping occurs (and possibly a set of neighboring values) is not modified in order to reduce the possibility of creating objectionable artifacts.

In an alternative embodiment, the correction parameter 44 found by the map analyzer 42 of FIG. 3 is simply the percentage of all pixels that are classified as clipped. This correction parameter 44 could then be used to "pro-rate" the effect of the image transform 46 on the original digital image 101. For example, if the correction parameter is zero (indicating no detected clipped pixels) then the image transform 46 may be applied with full effect. Alternatively, if the correction parameter 44 is 0.1 (indicating 10% detected clipped pixels), then the image transform 46 may have no effect. To illustrate, the image transform 46 operates according to the following equation:

$$q(x,y)=[1.0-10*\min(c,\ 0.1)]f(p(x,y))+10*\min(c,\ 0.1)p(x,y)$$

where:

p(x,y) is the original digital image 101 input to the image transform 46 q(x,y) is the enhanced digital image 48 output from the image transform 46 c is the correction parameter 44 derived as the percentage of pixels detected as clipped pixels f( ) is a function to apply, such as a LUT to modify the balance or contrast of the original digital image 101.

It is easy to see that for an image without any detected clipped pixels, c=0 and:

$$q(x,y)=f(p(x,y))$$

When there are many clipped pixels, c>=0.1 and q(x,y)=p(x,y). In other words the image transform 46 outputs an enhanced digital image 48 that is identical to the original digital image 101. This minimizes the risk of creating objectionable artifacts.

The method of the present invention can be performed in a digital camera or in a digital printer The invention has been described in detail with particular reference to certain preferred embodiments thereof, but it will be understood that variations and modifications can be effected within the spirit and scope of the invention.

PARTS LIST 10 image capture device
12 uniformity mapper
14 uniformity map
16 threshold applicator
20 digital image processor
22 clipped pixel map
30 image output device
40 general control compute
42 map analyzer
44 correction parameters
46 image transform
48 enhanced digital image
50 display device
52 combiner
54 analysis map
56 histogrammer
58 histogram analyzer
60 input control device
70 offline memory device
101 original digital image
102 enhanced digital image
132 filter applicator
134 enhanced clipped pixel map

What is claimed is:

1. An improved method for detecting clipped pixels of a digital color image, comprising the steps of:
    (a) producing a uniformity map from the digital color image, said uniformity map indicating locations within the digital color image that are substantially uniform;
    (b) providing a threshold value; and
    (c) using the uniformity map, the threshold value, and the digital color image to produce a map indicating the location of clipped pixels within the digital color image.

2. The method as claimed in claim 1 wherein the map indicating the location of clipped pixels is applied to a filter to produce an enhanced map.

3. The method as claimed in claim 1 further comprising the steps of applying the map indicating the location of clipped pixels to a map analyzer to produce one or more correction parameters based on a characteristic of the clipped pixels; and applying the correction parameters to an image transform to enhance the digital color image in accordance with the correction parameters.

4. The method as claimed in claim 3 wherein the characteristic is that the clipped pixels are highlight pixels and the image transform is a scene balance algorithm or an exposure determination algorithm.

5. The method as claimed in claim 3 wherein the characteristic is that the clipped pixels are highlight pixels and the image transform performs a tone scale adjustment of the digital color image.

6. The method as claimed in claim 3 wherein the digital color image comprises a plurality of color channels and the map analyzer employs a histogram-based process to operate on image pixels of the digital color image that are clipped in two or more of the channels.

7. The method as claimed in claim 3 wherein the correction parameter relates to the percentage of pixels that are clipped and is used by the image transform to pro-rate the effect of the image transform on the digital color image.

8. An improved method for detecting clipped pixels of a digital color image, comprising the steps of:
 (a) producing a uniformity map from the digital color image, said uniformity map indicating regions within the digital color image that are substantially uniform, and furthermore indicating locations within the digital color image where the variation of pixel values within a local region is below a first threshold;
 (b) providing a second threshold value; and
 (c) using the uniformity map, the second threshold value, and the digital color image to produce a map indicating the location of clipped pixels within the digital color image.

9. The method as claimed in claim 8 wherein the map indicating the location of clipped pixels is applied to a filter to produce an enhanced map.

10. The method claimed in claim 8, wherein the uniformity map indicates locations within the digital color image where the pixel values are identical.

11. The method claimed in claim 8, wherein the second threshold is applied to pixels within a substantially uniform region that are below the first threshold.

12. The method as claimed in claim 8 further comprising the steps of applying the map indicating the location of clipped pixels to a map analyzer to produce one or more correction parameters based on a characteristic of the clipped pixels; and applying the correction parameters to an image transform to enhance the digital color image in accordance with the correction parameters.

13. The method as claimed in claim 12 wherein the characteristic is that the clipped pixels are highlight pixels and the image transform is a scene balance algorithm or an exposure determination algorithm.

14. The method as claimed in claim 12 wherein the characteristic is that the clipped pixels are highlight pixels and the image transform performs a tone scale adjustment of the digital color image.

15. The method as claimed in claim 12 wherein the digital color image comprises a plurality of color channels and the map analyzer employs a histogram-based process to operate on image pixels of the digital color image that are clipped in two or more of the channels.

16. The method as claimed in claim 12 wherein the correction parameter relates to the percentage of pixels that are clipped and is used by the image transform to pro-rate the effect of the image transform on the digital color image.

* * * * *